Aug. 6, 1929.    W. KIRKBRIDE    1,723,789
HYDRAULIC STEERING MECHANISM
Filed Dec. 15, 1927
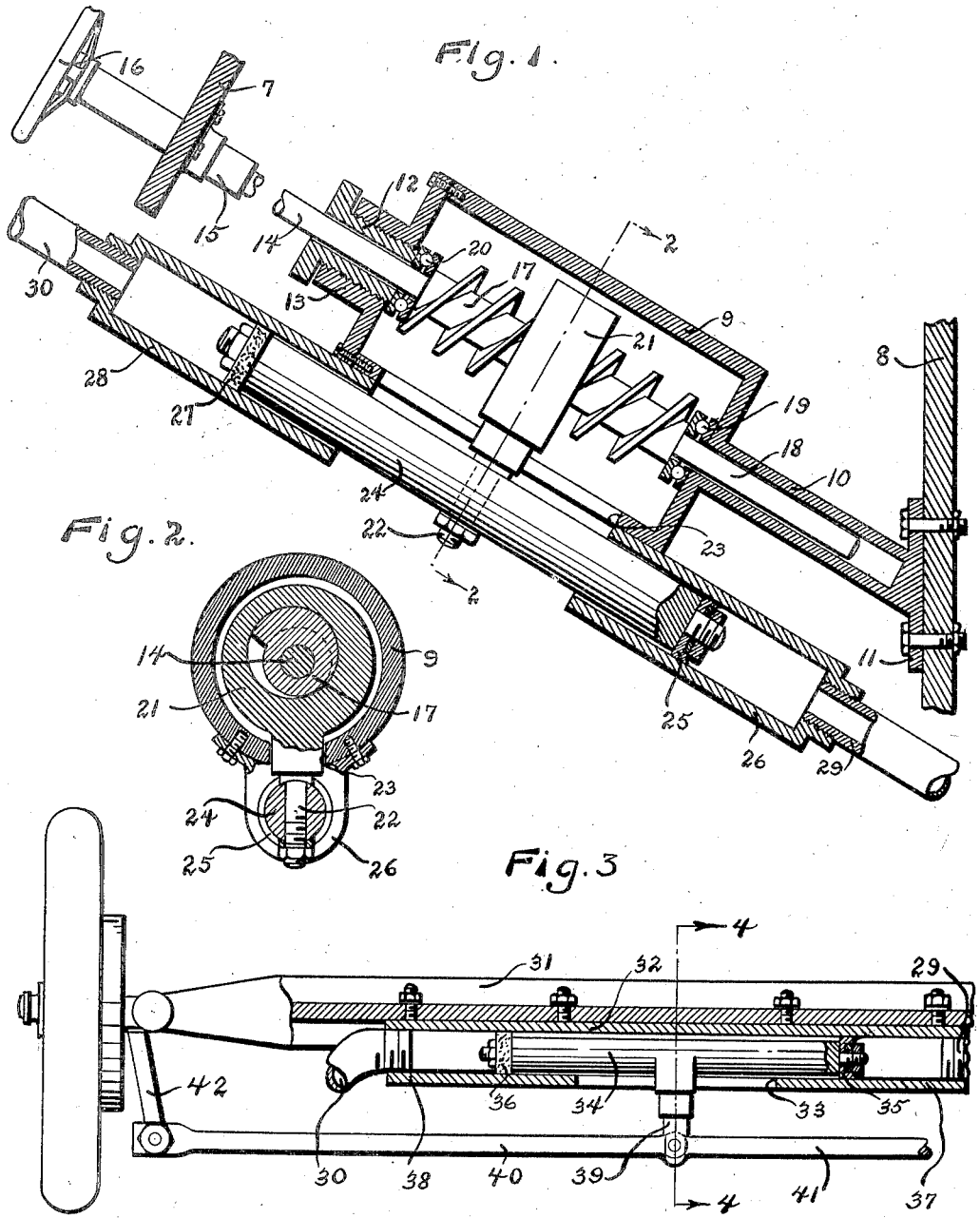
INVENTOR.
William Kirkbride
BY
ATTORNEY.

Patented Aug. 6, 1929.

1,723,789

UNITED STATES PATENT OFFICE.

WILLIAM KIRKBRIDE, OF DETROIT, MICHIGAN.

HYDRAULIC STEERING MECHANISM.

Application filed December 15, 1927. Serial No. 240,218.

My invention relates to a new and useful improvement in a hydraulic steering mechanism adapted for use on vehicles of various kinds.

It is an object of the present invention to provide a steering mechanism whereby the thrust delivered to the steering wheel may be hydraulically transmitted to the traction wheels which are operated to steer the vehicle.

Another object of the invention is the provision in a steering mechanism of a hydraulically operated mechanism which will be compact, durable, easily and quickly operated, and highly efficient in use.

Another object of the invention is the provision of a steering mechanism in which a maximum amount of movement may be given to the steering traction wheels of the vehicle with a minimum amount of movement of the steering wheel.

Another object of the invention is the provision of a steering mechanism in which vibration on the steering mechanism may be reduced to a minimum and in which the vibration or "shimmying" on the front wheels of the vehicle may be eliminated.

Another object of the invention is the provision of a steering mechanism in which the use of jointed connections may be reduced to a minimum so that rattling of the parts is obviated.

Another object of the invention is the provision of a steering mechanism in which lost motion may be dispensed with.

Other objects will appear hereinafter.

The invention consists in the combination and arrangement of parts hereinafter described and claimed.

The invention will be best understood by a reference to the accompanying drawings which form a part of this specification, and in which, Fig. 1 is a longitudinal central sectional view of a part of the invention showing it applied.

Fig. 2 is a sectional view taken on line 2—2 of Fig. 1.

Fig. 3 is a longitudinal central vertical sectional view of another part of the invention showing it applied.

Fig. 4 is a sectional view taken on line 4—4 of Fig. 3.

The particular location of the actuating mechanism is a matter which can be determined in the exercise of the engineer laying out the work, but in the drawings I have shown the invention mounted between the dash 7 and the cowl 8 of the vehicle. A housing 9 is provided, projecting outwardly from which is the tubular neck 10 provided with the flange 11 which may be bolted or otherwise suitably secured to the cowl 8. A packing gland 12 is threaded into a neck 13 formed on the opposite end of the housing 9. A steering post 14 projects through the steering column 15 and is provided with the steering wheel 16. The steering post 14 projects through the gland 12 which serves as a bearing therefor and is provided with the enlarged threaded portion 17, projecting outwardly from which is the reduced portion 18 engaging in the neck 10. Positioned about the reduced portion 18 is a thrust bearing 19 and a similar thrust bearing 20 is positioned about the portion 14. Threaded on the threaded portion 17 is a nut 21, projecting outwardly from which is a threaded stem 22 which is adapted to ride in the slot 23 formed in the housing 9. This stem 22 projects through a ram 24 which is provided, at one end, with a washer 25, this nut and the washer 25 riding in a cylinder 26. The opposite end of the ram 24 is provided with a washer 27 and rides in a cylinder 28. A pipe line 29 communicates with the cylinder 26 and a pipe line 30 communicates with the cylinder 28.

Mounted upon the front axle 31 of the vehicle and extending longitudinally is a barrel 32 having a slot 33 formed therein. Riding in the barrel 32 is a ram 34 having a washer 35 at one end and a washer 36 at the other end, one end of the barrel 32 forming a cylinder 37 in which the washer 35 may ride, and the other end forming a cylinder 38 in which the washer 36 may ride. The pipe line 29 communicates with the cylinder 37 and the pipe line 30 communicates with the cylinder 38.

Projecting outwardly from the ram 34 is a stem 39 which is bifurcated, embraces and is pivotally mounted to the sections 40 and 41 of the connecting rod, these sections being pivotally connected at their opposite ends to the steering knuckles 42 in the usual manner.

In operation, when the steering post 14 is rotated, the nut 21 will travel upwardly or downwardly in the housing 9, depending upon the direction of rotation, and as this nut travels upwardly or downwardly it will force the ram 24 to travel in the same direction, forcing oil or other liquid which is contained in the cylinder and pipe line to flow outwardly from the cylinder 26 through the pipe 29 or outwardly from the cylinder 28 through the pipe 30. This oil will force a movement of the ram in either direction, depending upon direction of movement of the ram 24. It will be noted that the piping 29 and 30 is substantially one-half the diameter of the cylinders 26 and 28, the cylinders 37 and 38 being the same diameter as the piping 29 and 30. This arrangement is provided so that the ram 34 will be forced to travel in response to the hydraulic pressure exerted by the ram 24 twice the distance of the travel of the ram 24. As the ram 34 moves in either direction, it will effect a turning of the front wheels or the traction steering wheels of the vehicle to effect the desired steering.

With a steering mechanism constructed in this manner there is provided a hydraulically operated mechanism in which the various objects sought to be attained are accomplished.

While I have illustrated and described the preferred form of my invention, I do not wish to limit myself to the precise details of structure shown, but desire to avail myself of such variations and modifications as come within the scope of the appended claims.

Having thus described my invention what I claim as new and desire to secure by Letters Patent is:

1. In a steering mechanism of the class described: a housing; a steering post projecting into said housing; a threaded portion on said steering post; a nut on said threaded portion; a ram; means for connecting said ram to said nut; and a pair of cylinders, each adapted for reception of one end of said ram.

2. In a steering mechanism of the class described: a housing; a tubular neck projecting outwardly from one end of said housing; a steering post projecting into said housing and having a portion bearing in said neck; a threaded portion on said steering post interiorly of said housing; means engageable with said threaded portion and axially movable of said steering post upon rotation thereof; a ram; means for connecting said ram to said axially movable means; and a pair of cylinders, each adapted for reception of one end of said ram.

In testimony whereof I have signed the foregoing specification.

WILLIAM KIRKBRIDE.